United States Patent [19]

Patterson

[11] Patent Number: 5,044,647

[45] Date of Patent: Sep. 3, 1991

[54] STABILIZED RECLINING WHEELCHAIR SEAT

[75] Inventor: Donald Patterson, Longmont, Colo.

[73] Assignee: Folio Products, Inc., Longmont, Colo.

[21] Appl. No.: 438,874

[22] Filed: Nov. 17, 1989

[51] Int. Cl.[5] .............................................. B62M 1/14

[52] U.S. Cl. ................................ 280/250.1; 180/907; 280/304.1; 297/317; 297/322; 297/329; 297/330; 297/346

[58] Field of Search .............................. 180/907, 65.1; 280/304.1, 250.1; 297/317, 322, 325, 330, 344, 346, 329, DIG. 4

[56] References Cited

U.S. PATENT DOCUMENTS

| | | | |
|---|---|---|---|
| 2,578,828 | 12/1951 | Nelson | 280/250.1 |
| 3,191,990 | 6/1965 | Rugg et al. | 297/83 |
| 3,936,893 | 2/1976 | Anderson et al. | 297/90 |
| 4,183,578 | 1/1980 | Naganawa | 297/90 |
| 4,333,681 | 6/1982 | Nelson | 297/83 |
| 4,477,117 | 10/1984 | Higgs | 297/45 |
| 4,655,471 | 4/1987 | Peek | 280/250.1 |
| 4,725,188 | 2/1988 | Zimmerman et al. | 414/678 |
| 4,834,411 | 5/1989 | Willey et al. | 297/DIG. 4 |
| 4,842,232 | 6/1989 | Pipon et al. | 297/344 |

FOREIGN PATENT DOCUMENTS

| | | | |
|---|---|---|---|
| 2029334 | 3/1980 | United Kingdom | 297/DIG. 4 |

*Primary Examiner*—Andres Kashnikow
*Assistant Examiner*—Eric Culbreth
*Attorney, Agent, or Firm*—James E. Pittenger

[57] ABSTRACT

A kit or assemble is provided which can be used in the manufacture of a new wheelchair or to retrofit an existing wheelchair. The basic wheelchair structure includes a base portion having a pair of cross members mounted in the rear half of the upper portion of the wheelchair base structure. A pair of parallel guide rails are mounted between the cross members with a seat support bar attached to a pair of pillow blocks mounted on the guide rails. A linear actuator is centrally positioned within the wheelchair base structure to longitudinally move the seat support bar forwardly or rearwardly within the wheel base of the wheelchair. A rear edge of a wheelchair seat unit is pivotally attached to the upper surface of the seat support bar. Cam plates, each having a curved cam slot, are provided on each side of the seat unit with the cam slots engaging cam followers mounted on a pair of stanchions provided on each side of the rear portion of the base structure. A control switch causes the linear actuator to move the seat support bar in a forward or rearward direction which causes the seat unit to move causing the cam follower pins positioned within the cam slots to tilt or angularly move the seat unit to a maximum reclined position of approximately 60 degrees. The entire seat unit is moved forward a predetermined distance to obtain the desired degree of tilt and to maintain the center of gravity substantially centered within the base structure to maintain the balance and stability of the wheelchair and the safety of the patient.

20 Claims, 3 Drawing Sheets

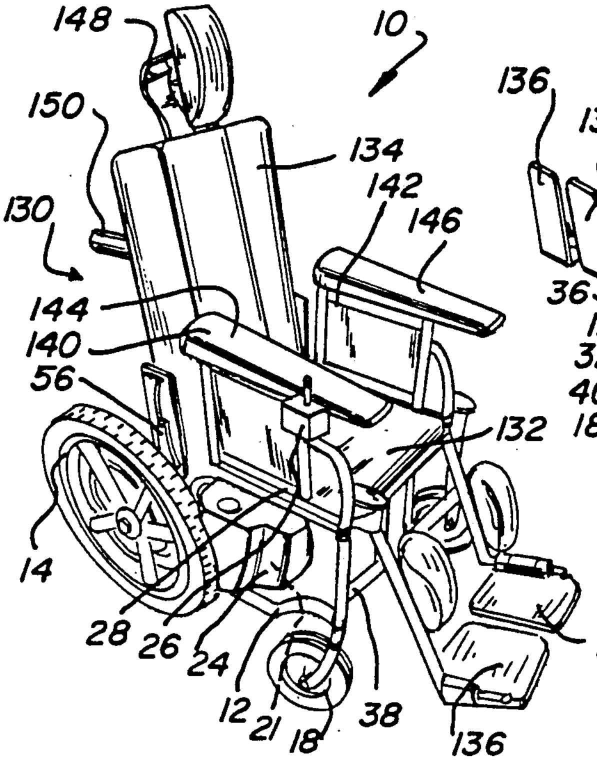
Fig_1
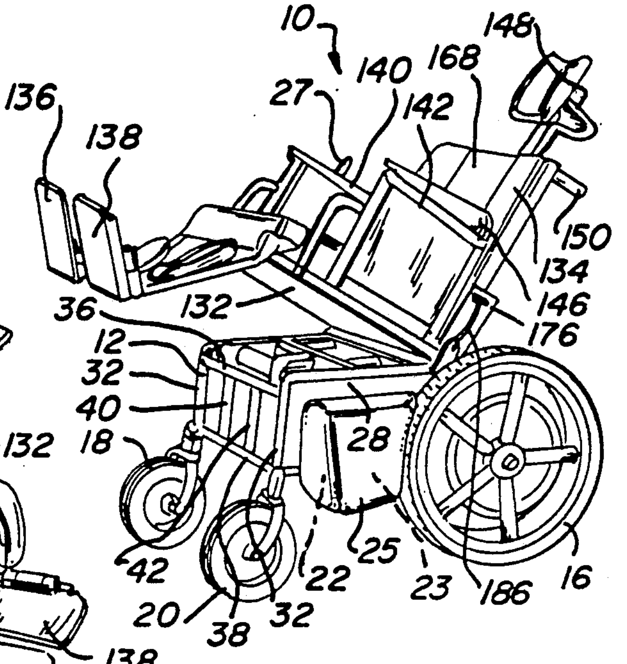
Fig_2
Fig_3
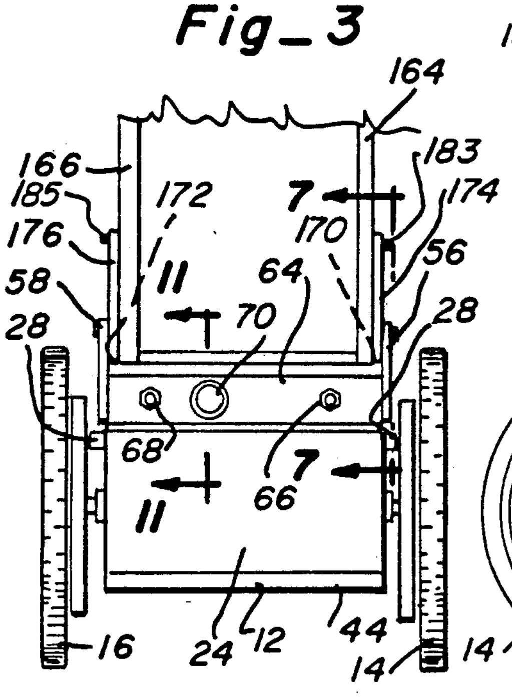
Fig_4
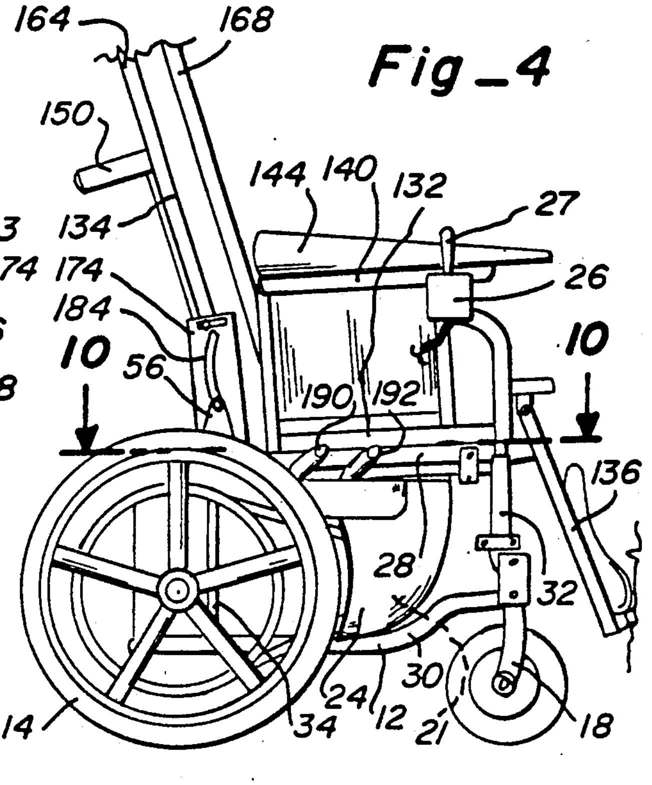

STABILIZED RECLINING WHEELCHAIR SEAT

FIELD OF THE INVENTION

This invention relates to a kit for retrofitting a wheelchair so that the seat and back of the wheelchair will recline as an integral unit. It is more specifically directed to a kit assembly for wheelchairs which will allow the seat to recline as a unit and reposition the weight of the user so that the center of gravity of the chair and the user will remain within the wheelbase of the chair for stability and safety.

BACKGROUND OF THE INVENTION

Wheelchairs having various designs and configurations have been used over a period of many years to provide help and assistance to handicapped personnel. In many cases where the handicapped person has limited or no use of his or her legs such as paraplegics and quadriplegics, the sole means of individual transportation is through the use of a wheelchair.

Over the past recent years, the design of wheelchairs has become very complex and sophisticated as a result of efforts intended to help the person so that they acquire a higher degree of control over their position within the chair as well as their mobility. Thus, in recent history, powered wheelchairs have incorporated a number of various control and safety devices to assist handicapped individuals so that they can achieve independent operation and movement.

One of the major problems that has been encountered by a paralyzed person whether he or she is a paraplegic and quadriplegic is the necessity to shift or move the body weight with respect to the support provided by a chair, wheelchair, bed or similar device.

This periodic shifting of the weight of a person's body is essential to prevent the occasion of ulcers, infection and possibly gangrene. This is due to the fact that the continuous pressure of the body's weight on certain specific locations of the body such as that provided by the skeletal structure such as hips causes the supporting skin to lose circulation causing it to deteriorate and possibly die. For this reason, it is absolutely necessary that a periodic or intermittent shifting of the weight of the paralyzed person be provided to prevent this condition.

In the past, with respect to a wheelchair, it has been found that if the user is tilted onto his or her back approximately 45 to 60 degrees, this provides sufficient shift in the body weight to permit circulation in the essential skin areas. This complete shifting of the weight is required about every 20 minutes.

In some cases, a nurse or attendant stands behind the wheelchair and manually tilts it backwards and supports it for a sufficient length of time to provide the beneficial effect. On the other hand, it is much more desirable to provide a mechanism built into the chair to allow the patient to perform this function himself.

Up to the present, a number of attempts have been made to accommodate a wheelchair so that various arrangements of the seat, back and leg support can be changed, all with respect to each other. In other words, in some situations, the seat remains permanently positioned and the back is tilted backward while the leg support is pivoted upward. This allows the patient to be moved to a supine position. Many of these wheelchair mechanisms are quite complex and require extensive mechanical linkage and mechanism so as to move the individual components in proper relationship with each other.

An object of the present invention is to provide a wheelchair mechanism which can be used to modify or retrofit a new or existing wheelchair which will allow the patient to control the tilting of the chair seat and back to periodically relieve the pressure spots and eliminate the possibility of skin and tissue degeneration.

It is also another object to provide a simple mechanism whereby the chair with the seat and back rigidly connected move as a unit to prevent the pulling or shearing of the patient's skin and tissue during the body movement. This is especially important due to the fact that the handicapped person does not have any sensation or feel in the skin whereby a pulling condition on the skin can take place without the patient realizing it.

Another object of the present invention is to provide a kit or retrofit assembly whereby the unitary seat of the wheelchair can be tilted automatically by the patient a sufficient distance and yet allow the weight of the patient and the wheelchair to remain within the wheelbase of the chair to maintain stability and security even while the wheelchair is moved.

INFORMATION DISCLOSURE STATEMENT

The following information is provided to fulfill the applicant's acknowledged duty to inform the Patent Office of any and all information which is pertinent to the examination of this application.

The Naganawa patent (U.S. Pat. No. 4,183,578) discloses an electrically operated wheelchair which includes a mechanism for reclining the patient sitting in the chair. This mechanism is arranged so that the backrest moves toward a substantially horizontal position while the seat and cushion moves vertically upward to a level approximately equal to the top of the arm rests of the chair. At the same time, the footrests pivot outwardly so that they extend substantially horizontal at the same level as the chair seat. This arrangement raises the center of gravity of the chair which makes the chair unstable and easily tipped.

The Rugg, et al. patent (U.S. Pat. No. 3,191,990) discloses a reclining mechanism for wheelchairs. This mechanism includes pivots and links for simultaneously moving the chair back, chair seat and leg rests in relation to each other so that the patient can be moved from a relatively vertical upright position to a supine or laying down position. The front portion of the seat rises while the seat moves backward with respect to the backrest to attempt to follow the contour of the patient's body. This is a complex and interdependent mechanism which requires a substantial number of parts in order to effect the desired movement.

The Anderson, et al. patent (U.S. Pat. No. 3,936,893) shows a wheelchair mechanism for elevating the chair seat as the patient is moved to a reclined position. The elevation of the seat and back moves upwardly to correspond to the level of a hospital bed. The raising or vertically elevating mechanism as well as the patient's body causes the instability of the chair and the lack of safety and security which is provided in the applicant's invention.

The Peek patent (U.S. Pat. No. 4,655,471) discloses a wheelchair having a backrest assembly that is pivotally connected adjacent the rear portion of the seat frame. A slotted cam way is attached to the backrest portion of the chair with a pivoted lever providing a cam action to lower the backrest with respect to the seat. In this arrangement the seat remains permanently fixed in a horizontal position while the back is reclined by the use of a linear actuator and motor.

The Higgs patent (U.S. Pat. No. 4,477,117) discloses a folding wheelchair which has a structural arrangement to elevate the seat and back rest of the chair as a unit. The seat structure is independent of the main structure of the wheelchair so that the seat moves independently up and down within the wheelchair structure. The leg rest is arranged to move vertically with the integral seat.

The Nelson patent (U.S. Pat. No. 4,333,681) has a reclining mechanism which allows the seat, back and leg rests to move with respect to each other to a substantially flat or reclined position. The forward portion of the seat pivots upwardly at the same time that the back pivots downward which causes the patient's weight to be raised and moved to an elevated position. Again, the mechanism used for this purpose is quite complex and the raising of the patient's body produces an instability in the use of the chair.

The Zimmermann, et al. patent (U.S. Pat. No. 4,725,188) is a separate and independent device from the wheelchair. In this device, the wheelchair is moved backwardly into the device and the entire chair along with the seated patient is tilted backward to shift the weight of the patient or user. This device obtains the same effect, but does it in a substantially different way than the previous prior art cited or the arrangement provided in the applicant's novel invention.

SUMMARY OF THE INVENTION

The present invention is directed to a mechanism which can be included in the construction of a new motorized wheelchair or to retrofit an existing wheelchair. It is primarily understood that this device is intended to be used on wheelchairs which are mobile and controllable by the patient through the use of an electric power source such as a battery and motors for independently powering the individual drive wheels of the chair.

In the present invention the seat and back of the chair is provided as an integral unit. This is to say that in use, the seat and back move as a single structure or unit and remain in relative angular relationship with each other. A mechanical adjustment is provided for setting the actual angular relationship between these two parts. Patient leg and arm rests are provided as a part of the wheelchair seat structure and are rigidly attached to the seat for supporting the patient's legs and arms. A head rest can also be provided.

The unified seat structure is slidably mounted to the wheelchair structure by means of a pair of guide rails which are provided on each side of the seat and attached permanently to the wheelchair structure. An electrically operated linear actuator is mounted below the seat unit with one end permanently secured to a cross member at the forward end of the wheelchair structure with the rear portion attached to a seat support bar provided at the rear of the seat unit. The seat support bar is attached to the guide rails through continuous ball-bearing pillow blocks. A vertical arm or stanchion is mounted on both sides of the wheelchair structure with a roller cam arranged to fit a curved cam slot which is provided on a bracket attached to the outer portion of the side members of the seat back.

With this extremely simple and easily mounted mechanism the extending or retracting of the electrical linear actuator causes the rear edge of the seat to move forward and back within the confines of the wheelbase of the wheelchair structure. As the chair unit is tilted backward, the seat base moves forward with the pivot point held at a constant distance or elevation from the chair support surface. Thus, the patient's weight is maintained at essentially the same elevation, but is tilted backward as the seat moves which maintains the center of gravity of the patient and the wheelchair substantially near the midpoint between the forward and rear wheels of the chair. This maintains the position of the center of gravity so that there is at most only a minor shift in the overall center of gravity which maintains the stability of the chair.

Hand controls for electrically operating the linear actuator for tilting or reclining the chair unit may be provided on an arm rest. Power for the actuator is obtained from the electrical power source such as a battery which is common in a motorized wheelchair of this nature.

Other features of this invention will appear in the following description and appended claims, reference being made to the accompanying drawings forming a part of this application wherein like reference characters designate corresponding parts in the various views.

BRIEF DESCRIPTION OF THE DRAWINGS

FIG. 1 is a perspective view of a wheelchair which has been modified in accordance with the present invention;

FIG. 2 is a perspective view of the wheelchair of FIG. 1 in an inclined position;

FIG. 3 is a partial rear elevation view;

FIG. 4 is a side elevation view;

DETAILED DESCRIPTION OF THE INVENTION

Figure 5:
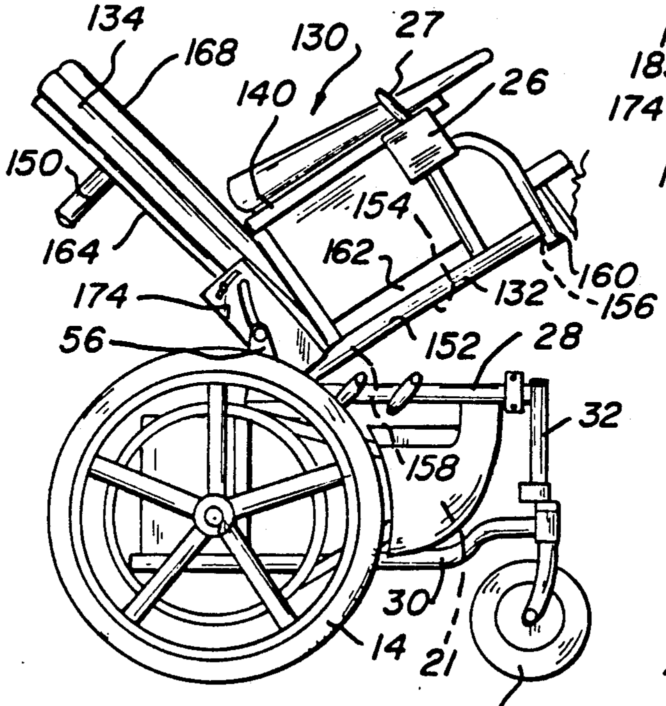
FIG. 5 is a side elevation view showing the wheelchair in a partially reclined position.

Turning now more specifically to FIGS. 1 and 2 a modified wheelchair 10 according to the present invention is illustrated. The wheelchair 10 includes base framework 12, and large drive wheels 14, 16 which can be located in the front or rear of the framework 12. At the opposite end of the framework 12 from the drive wheels is positioned a pair of small castering or swiveling wheels 18, 20 which allow the wheelchair 10 to be easily maneuvered by differentially applying either forward or rear rotation to the drive wheels 14, 16.

In many cases the modern wheelchair is motorized which means that individual electric motors (21, 23) are mounted on the framework 12 adjacent to each respective drive wheel 14, 16. These individual motors 21, 23 are drivingly connected to the drive wheels 14, 16, respectively, and they are attached to a power source such as a storage battery 22 and mounted within housings 24, 25. An electrical multiposition toggle switch 26 having lever 27 is mounted in a convenient position such as on an arm rest so that it is readily accessible to the user. The toggle switch 26 is electrically connected to the battery and the individual drive motors for wheels 14, 16 so that the forward and rearward rotation of each of the individual wheels and the speed of rotation of these wheels can be easily controlled to efficiently maneuver and control the movement of the wheelchair 10.

The framework 12 consists on each side of the wheelchair 10 of upper horizontal support member 28, lower horizontal support member 30, forward vertical support member 32 and rearward vertical support member 34. These support members 28, 30, 32, and 34 form a substantially rectangular box structure to which the rear wheels 14, 16 are rotatably mounted along with the forward castering wheels 18, 20. It is to be understood that even though the same identification numerals are used on the framework portions of each side of the wheelchair, they are actually mirror images of each other.

The side portions of the framework 12 are interconnected by forward upper cross member 36 and lower forward cross member 38. Vertical stiffening members 40, 42 can be provided if desired for strength and providing rigidity in the overall framework 12. A horizontal rear cross member 44 can be provided to tie the framework 12 together into a rigid tubular box-like supporting structure.

Up to now, the wheelchair structure which has been described is fairly standard for most conventional wheelchairs that are available on the market. The present invention is directed primarily to additional structure which is added to the above-described framework to accomplish the new and novel result which is intended.

The applicant's invention is directed to a kit or assembly that can be used in the manufacture of new wheelchairs to provide the novel feature that is disclosed herein. At the same time, the kit or assembly can be provided to wheelchair owners, repairmen or manufacturers who retrofit existing equipment so that any existing wheelchair can be modified so as to utilize the arrangement which is shown and disclosed in this application.

Figure 10:
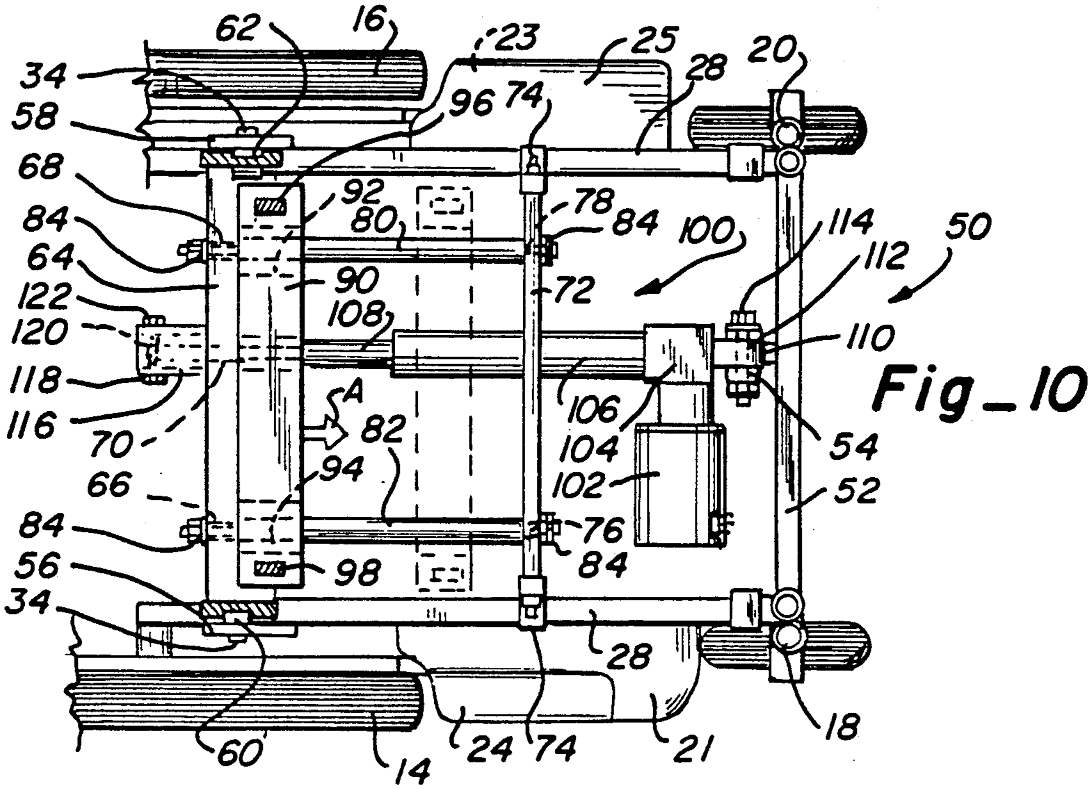
FIG. 10 is a cross-sectional view taken along lines 10—10 of FIG. 4.
Figure 11:
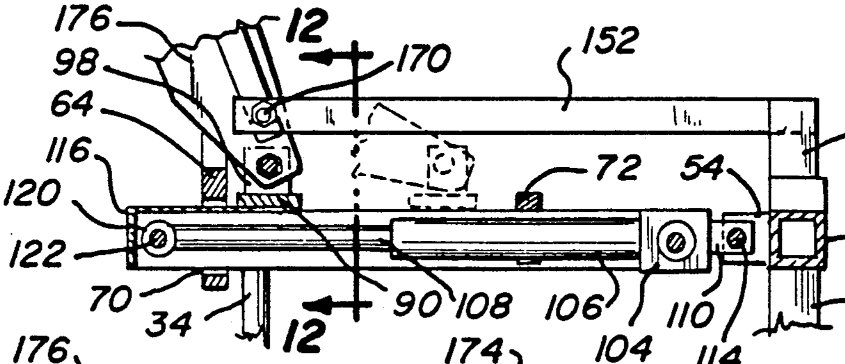
FIG. 11 is a cross-sectional view taken along lines 11—11 of FIG. 3.
Figure 12:
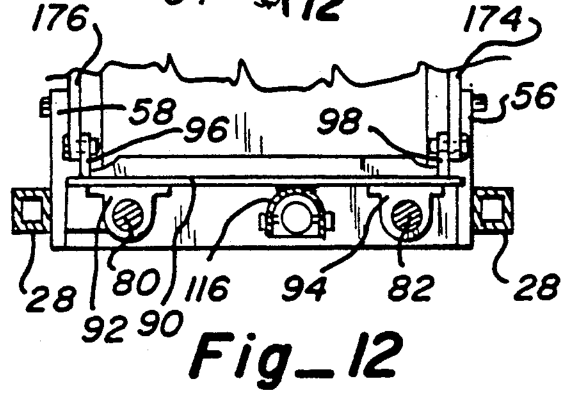
FIG. 12 is a cross-sectional view taken along lines 12—12 of FIG. 11 showing the support guide rails for the seat unit.
Figure 13:
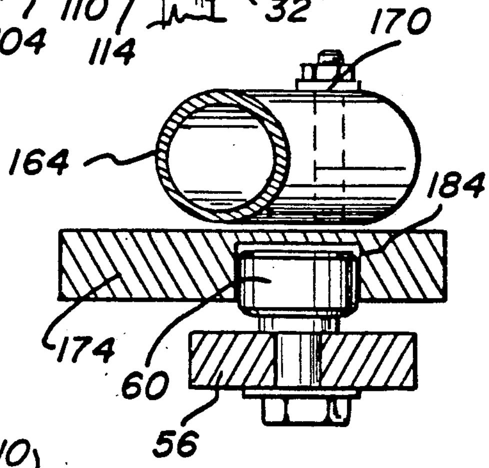
FIG. 13 is a cross-sectional view taken along lines 13—13 of FIG. 7.
Figure 14:
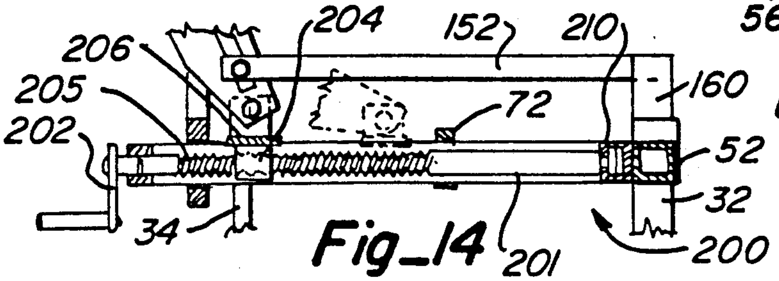
FIG. 14 is a cross-sectional view similar to FIG. 11 showing a manual screw for positioning the seat unit.

The applicant's assembly or kit 50 is best shown in FIGS. 10-12. The kit or assembly 50 includes a forward cross bar 52 having a clevis connection 54. The forward cross bar 52 can be attached directly to the existing cross member 36 provided on the wheelchair or if desired, the forward cross bar 52 can include a prefabricated assembly similar to the arrangement provided by the existing upper cross bar 36, lower cross bar 38 and vertical support members 40, 42. The cross bar or assembly 52 can duplicate this structure or replace the existing members if desired. It is to be understood, however, that the forward cross member 52 could also be fixedly attached to the upper surface of the forward cross member 36 and either clamped or welded to this member to provide additional rigidity. The important thing that must be maintained is the position of the clevis 54 which needs to be on the same level or in the same plane as the other top members in the structural framework 12.

Figure 7:
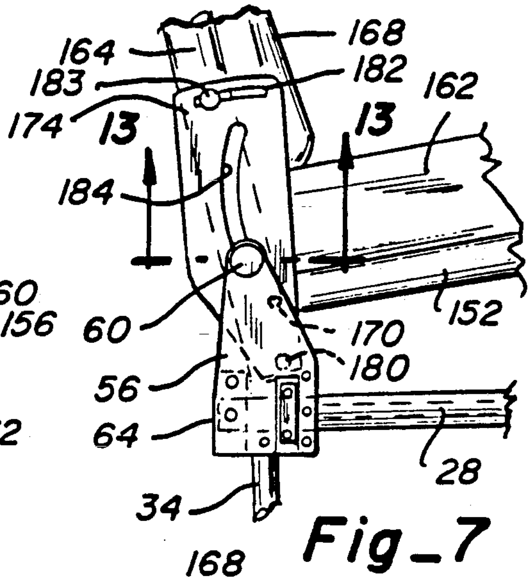
FIG. 7 is a cross-sectional view taken along lines 7—7 of FIG. 3 showing the seat unit in an upright position.
Figure 8:
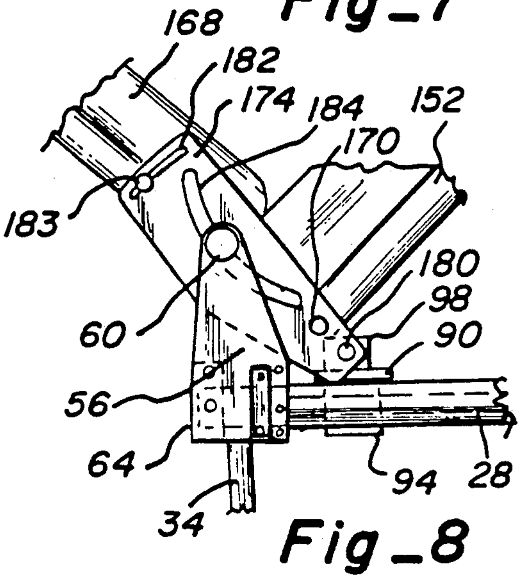
FIG. 8 is a cross-sectional view showing the seat unit in a partially reclined position.
Figure 6:
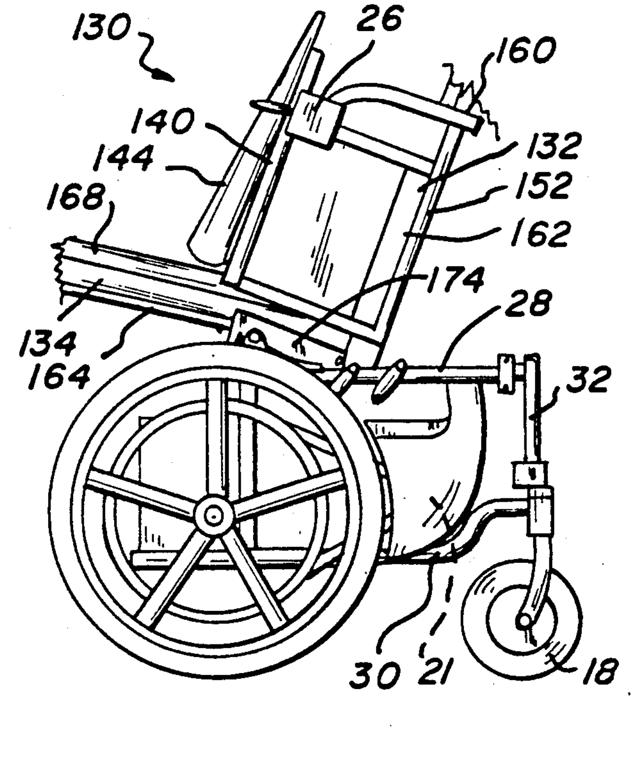
FIG. 6 is a partial side elevation view showing the wheelchair in the fully reclined position.
Figure 9:
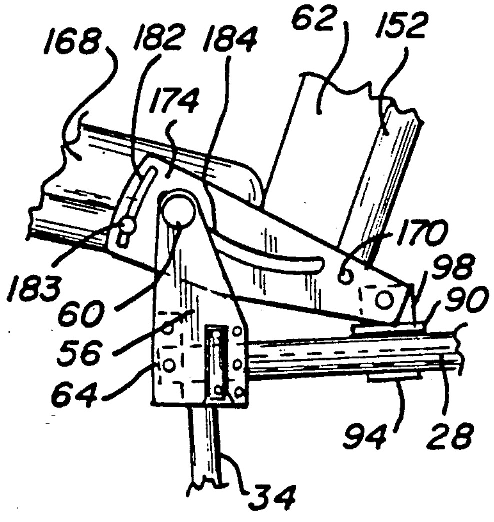
FIG. 9 is a cross-sectional view showing the seat unit in a fully reclined position.

As seen in FIG. 7, upwardly extending stanchions 56, 58 are mounted at the junction of the upper horizontal side member 28 and rear vertical side member 34. These stanchions are usually attached to the outer surfaces of the side members by clamps, welding or any other suitable attaching arrangement. At the upper end of each of the stanchions 56, 58 is mounted inwardly extending cam follower pins 60, 62, respectively. These cam follower pins extend inwardly towards each other and towards the structure of the novel wheelchair seat unit. The follower pins can have an outer sleeve which is freely rotatable on a suitable bearing such as a plurality of needle bearings. The positioning of the cam follower pins 60, 62 is approximately 4–5 inches above the top surface of the side support members. The purpose and operation of the cam pins will be discussed in detail below.

A stout, relatively thick cross brace or member 64 is mounted laterally across the wheelchair structure between the stanchions 56, 58. Suitable bolts can be used to attach the cross brace 64 to the respective stanchions. The cross brace 64 has a pair of apertures 66, 68 which are spaced inwardly from the side members 28 of the wheelchair structure. In addition, there is a large opening 70 provided in the cross brace 64 near its midpoint or center.

An intermediate cross brace or member 72 is spaced forwardly of the rear cross brace 64 approximately 12–15 inches. Intermediate cross brace 72 is suitably attached to upper side members 28 by suitable fasteners such as clamps 74 which are provided at each end. Intermediate cross brace 72 also includes apertures 76, 78 which are spaced inwardly from side members 28 the same distance as that provided for apertures 66, 68 in rear cross brace 64. Seat support or guide rails 80, 82 are provided which are mounted between the rear cross brace 64 and intermediate cross brace 72. The ends of the seat support rails 80, 82 can have a reduced diameter and be threaded so that the threaded ends can be inserted through their respective apertures and held rigidly in place. Suitable nuts 84 are threaded on the ends of the chair support rails 80, 82 to secure these rails in position with the cross braces. Thus, in this position, the seat support or guide rails 80, 82 are parallel to each other and substantially parallel to the upper side members 28 of the framework 12 and the longitudinal axis of the framework 12.

A transverse seat support bar 90 having a length which is slightly less than the distance between the upper side support bars 28 is positioned over the seat guide rails 80, 82. Pillow blocks 92, 94 are slidably mounted on the guide rails 80, 82, respectively. The pillow blocks are attached by suitable fasteners such as screws to the underside of the seat support bar 90. The pillow blocks are of the endless ball bearing type which allow slidable movement along the guide rails with very little friction or force. A fixed diameter pillow block which is manufactured by Thomson and called the "Super Ball Bushing" pillow block has been found to be quite satisfactory for the intended purpose. The diameter of the guide rail and the size of the pillow block is selected to provide the necessary strength for support of the wheelchair seat unit and yet allow friction-free movement along the guide rail. A pair of upwardly extending ears 96, 98 are provided near each end of the seat support bar 90. Each of the upwardly extending ears or tabs 96, 98 have a bore which will provide a pivotal attachment for the reclining wheelchair seat.

A power driven linear actuator 100 having a drive motor 102, gear box 104, housing 106 and push rod 108 is provided for slidably moving the seat support bar 90 longitudinally on the guide rails 80, 82. The short end 110 of housing 106 includes a mounting aperture 112. The actuator short end 110 is pivotally attached to clevis 54 by means of a bolt 114 passing through the clevis and the aperture 112 provided in the short end of the housing. A protective attachment housing 116 is fixedly attached at one end to the underside of the seat support bar 90. This attachment can be accomplished by the use of a plurality of screws or the housing can be welded directly to the undersurface of the bar. The opposite end of the housing which is sized to extend through the aperture 70 provided in the rear cross member 64 includes an attachment aperture 118. The outer end of the push rod 108 includes a swivel type eyelet 120. A bolt 122 is inserted through the housing aperture 118 and eyelet 120 to secure the eyelet to the end of the housing 116.

The drive motor 102 can be electrically driven by means of the battery power source 24 which is already present on motorized wheelchairs. The wires connecting the motor 102 to the battery 24 can be connected to a separate or combined toggle switch so that the motor can be operated in a forward or reverse direction by means of proper movement of the handle by the patient or user. The rotation of the motor 102 in one direction causes the push rod 108 to move outward or extend while reverse rotation of the motor causes the push rod 108 to retract or move inwardly into the housing 106. By retracting the push rod 108 the seat support bar 90 is moved inwardly towards the right as viewed in FIG. 10. The forward or longitudinal movement of the seat support bar 90 towards the center portion of the wheelchair frame 12 causes the wheelchair seat to recline as well as reposition the center of gravity of the patient or wheelchair to retain a stabilized position for the chair to prevent tipping or capsizing. This unique feature of the present invention will be discussed in further detail.

The wheelchair seat unit 130 includes seat portion 132, back portion 134 and a pair of forwardly extending leg and foot supports 136, 138. Arm rests 140, 142 are provided on each side of the seat portion 132 and are mounted so as to extend upwardly from the seat structure. The upper surface of the arm rests 140, 142 can include cushions or arm cups 144, 146, if desired. An adjustable head rest 148 is mounted on the back of the seat so as to properly support the patient's head. Handle grips 150 can be provided on the back of the seat structure 134 to allow another person to manually move or control the operation of the wheelchair 10.

It is to be understood that the wheelchair seat unit 130 operates as a single integrated unit. The leg rests 136, 138, arm rests 140, 142, and head rest 148 are adjustably attached to the basic seat and back structure to provide comfort for the patient. All of these items are directly attached to the seat unit structure and move as a unit with the seat 130.

The seat portion 132 of the wheelchair seat unit 130 is composed of seat side members 152, 154 and forward and rear cross members 156, 158. The forward ends of the seat side members 152, 154 can include support blocks 160 on each side to hold the seat structure generally horizontal when in the upright position. A suitable fabric sling or a rigid platform board having a cushion 162 can be provided and supported between the seat side members 152, 154.

The seat back support structure 134 is formed by upright side members 164, 166 and a cross supporting member (not shown). A suitable fabric sling or rigid board and cushion 168 can be suitably mounted between the back side members 164, 166. The back side members 164, 166 are rigidly attached by means of bolts 170, 172 to the ends of the seat side members 152, 154, respectively forming a common connected edge.

A pair of cam plate 174, 176 are mounted to the outer surfaces of the common edge of the joint area at the juncture between the seat side members 152, 164 and 154, 166, respectively. For the purpose of illustration the cam plate 174 which is illustrated on the right side of the wheelchair seat unit 130 will be described. It is to be understood that cam plate 176 which is on the opposite side of the seat unit is a mirror image of the one being described.

The cam plate 174 as can be seen in FIG. 7 includes a fairly large aperture 180 provided near the lower end of the plate 174. Near the upper edge of the cam plate 174 is provided an open gently curved slot 182. The curvature of this slot has a radius which is the distance between the location of the seat and back connecting bolt and a bolt 183 which is positioned through the slot 182 and back side member 164. With this arrangement the angular position of the back 134 with respect to the seat 132 can be adjusted approximately 15 degrees. In this way, the relative position of the seat and back can be adjusted to fit and improve the comfort of the patient or user. A relatively wide, curved slot 184 is provided in the central portion of the cam plate 174. The curved slot 184 is generally aligned with the long or longitudinal axis of the cam plate 174 and has a total arc of approximately 4 to 5 inches. This slot can be open extending completely through the thickness of the cam plate 174 or can be arranged to extend partially through the cam plate with the back portion of the slot closed. A second aperture is provided through the cam plate 174 and spaced slightly below the bottom of the curved cam slot 184. The bolt coupling the seat side member 152 and back side member 164 extends through this aperture in order to tie the seat structure securely with the cam plate 174.

As mentioned above, the cam plate 176 which is a mirror image of the cam plate 174 is mounted to the left side of the seat unit structure. Again, the attachment bolt 172 joining the seat side member 154 and back side member 166 also attaches the cam plate 176. A set bolt 185 provided through the back side member 166 is used to angularly adjust the relative position between the back portion 134 and seat portion 132.

To assemble the integral seat unit 130 with the wheelchair structure 12, the bottom portion of the cam plates 174, 176 are positioned and aligned with the upright attaching ears 96, 98 provided on the slidable seat support bar 90. Suitable attaching bolts or fasteners 186 are installed through the apertures provided in the cam plates and upright ears to pivotally attach the integral seat unit to the support bar. Next, the upright cam follower stanchions are mounted to each side of the framework of the base structure of the wheelchair with the cam follower pins 60, 62 positioned within the relatively large central curved slots 184, 186 which are provided in the cam plates 174, 176, respectively. With the cam follower pins 60, 62 properly engaging the slots in the cam plates the seat unit is securely mounted to the wheelchair base structure. A will be explained later, actuation of the linear actuator 100 will cause the push rod 108 to pull the seat support bar 90 forward towards the center of the wheelchair structure and substantially between the wheels 14, 16 and forward swivel wheels 18, 20. As will be explained later, the seat unit along with the support for the patient is moved to a reclining position while at the same time the rear edge of the seat unit is slidably moved forward over the wheelchair structure to maintain the overall position of the center of gravity. In this arrangement, a stabilized reclining wheelchair is obtained which will provide greatly increased stability to the overall assembly which is not presently available in other wheelchairs.

It is also possible to substitute a mechanical screw-type mechanism 200 for the motorized linear actuator as described above. Thus, one end of a screw-type adjuster 201 can be journaled 210 at the forward end of the wheelchair framework structure 32 with the opposite end 205 extending beyond the rear portion of the wheelchair structure and having a crank 202 which allows the screw 201 to be manually turned. A threaded follower 204 can be attached to the underside of the integral seat support bar 206 in a manner similar to the previously described housing 116. In this way, a person can manually turn the crank to move the seat unit into a reclined position or to an upright position and any desired position therebetween. Either method of positioning the seat will obtain the new and novel results which are described and claimed in this application.

OPERATION

The following will be a brief description of the operation of the wheelchair unit and the positioning of the integral seat which is included as part of this apparatus. In order to better understand the operation and function of the structure comprising the present invention it will be helpful to understand the specific way in which the integral seat unit is repositioned from the vertical or upright position to the reclining position and still allow the center of gravity of the patient, seat unit and wheelchair structure to remain substantially centered between the support wheels.

The operation as described herein will apply primarily to FIGS. 5–9 which show the integral seat unit in various positions.

With the integral seat unit 130 in a substantially upright or vertical position the patient is placed in the seat and the arm rests 140, 142, leg rests 136, 138, and head rest 184 are adjusted to provide adequate comfort. In this position the motorized wheelchair can be operated by the patient or user manually controlling the forward, reverse and turning operation of the motorized drive wheels 14, 16 by use of control lever 26, 27 which is located along the side of the wheelchair structure. In this way, the patient can be substantially mobile without having the need for an additional person to control the movements of the wheelchair.

In addition, as it becomes necessary for the patient to shift his body weight or if he would prefer to recline his position for rest or even sleeping, the integral seat can be tilted or reclined by an actuating the control lever provided in the seat control switch represented by dual control 26, 27. In most cases, the movement of the lever forward will position the seat unit in the upright position while movement of the lever towards the rear will tilt the seat into any number of reclining positions between the vertical and full reclining arrangement. In most cases, the maximum angular movement of the seat will be approximately 60 degrees.

As the lever 27 is moved towards the rear electrical contact is made which connects the power source or battery 24 provided in the lower portion of the wheelchair structure to provide the proper voltage polarity to the linear actuator drive motor 102 to retract the push rod 108. The swivel eyelet 120 pulls on the bolt 122 coupled to the housing 118 which causes the housing to pull the seat support bar 90 in the direction shown by arrow A in FIG. 10. To move the seat to the fully reclined position the bar would be substantially moved to the location shown by dotted lines.

The housing 118 is provided as the connection between the push rod 108 and support bar 90 in order to substantially shield or cover the movement of the exposed push rod 108. This prevents clothing or other objects from being caught in the push rod when the reclining mechanism is actuated. Even though the housing 118 has been illustrated as a partial tubular structure, it is also possible that the housing can be completely enclosed forming a hollow structure to completely surround and protect the push rod 108 from interference with miscellaneous objects.

As the seat support bar 90 is moved longitudinally along the guide rails or rods 80, 82 the back edge of the integrated seat unit 130 is pulled forward while at the same time the stationary cam follower pins 60, 62 which are mounted on the upright stanchions 56, 58 cause the integral seat unit 130 to tilt or recline backwards with the cam follower pins 60, 62 riding within the curved slots 184, 186 in the cam plates 174, 176. The more the support bar 90 is moved forward the further the cam follower pins moved upwardly in the curved slots 184 185 until the end of the slot is reached. The length of the curved slots 184, 185 and the radius of curvature of these slots is predetermined to correlate with the overall length of movement of the support bar 90 so that the integral chair unit 130 will recline approximately 60 degrees. The forward movement of the support bar 90 is approximately 5 inches to obtain the maximum degree of angular pivot. Electrical limit switches can be provided to disconnect the motor when the limit of travel is reached.

It is to be understood that additional angular travel can be obtained by increasing the length of the slots 184, 185 while increasing the forward travel of the support bar 90. In addition, the radius of curvature of the slots 184, 185 can also be made to adjust or change the angular movement or tilt of the chair unit with respect to the overall wheelchair base structure. Various combinations of travel and slot configuration can be provided depending upon the desired movement while reclining the chair.

In accordance with the method of operation which has been disclosed, a new and unobvious mechanism is provided for installation on new motorized wheelchairs or for adapting or modifying existing motorized wheelchairs to increase or maintain the stability of the wheelchair to protect the patient or user of the wheelchair from tilting or falling which could substantially injure the patient. In this arrangement, the elevation of the chair itself is maintained at a horizontal or constant level to aid in keeping the center of gravity as low as possible. At the same time the chair and occupant are moved forward to maintain this center of gravity between the support wheels and as near to the original position as possible when the patient is sitting upright. In this way, the motorized wheelchair is stable during all modes of operation.

The components which make up the applicant's invention can be fabricated from any suitable material such as metal, plastics, or synthetic resins which have the necessary strength and rigidity to perform the required function. In most cases, it is anticipated that many of the parts will be manufactured from aluminum or other light-weight metals to help in reducing or maintaining the weight of the overall wheelchair as low as possible. By the same token, where additional strength is required such as in the chair guide rails which require a substantially smooth outer surface a quality stainless steel material may be used. While specific materials have been designated, it is to be understood that any suitable material which will preform the desired function is considered to fall within the purview of the applicant's invention.

Additional features and modifications of the stabilized reclining wheelchair seat are considered to be a part of this invention and are to be included within the scope of the dependent claims.

What is claimed is:

1. A wheelchair for transporting a handicapped user, the wheelchair having a base framework structure having upper side support rails on each side and a forward and rearward end portion, a pair of drive wheels rotatably mounted on each side of said base structure and near one end, and a second pair of wheels rotatably mounted one each side of said structure near the opposite end portion of said base structure from said drive wheels, said second pair of wheels being capable of castering, the improvement to said wheelchair comprising:

a) a seat unit having a seat portion and a back portion, said seat and back portion being joined together along a common edge to form a seat unit with the angular position of the seat and back portion being adjustably fixed;

b) a slidable support means for supporting said seat unit, said support means including guide rails fixedly attached to an upper portion of the wheelchair base structure, said support means having mounting means for pivotally mounting and supporting said seat unit;

c) means for moving the slidable seat support means in a longitudinal direction along said base framework structure whereby the slidable support means and seat unit can be moved between a rearward position and a forward position; and d) cam means arranged and fixedly attached between said base framework structure and said seat unit whereby as the moving means moved the seat unit towards a forward position the seat unit will be tilted backward toward a reclining position while at the same time the seat unit and user is moved forward so that the center of gravity of the wheelchair and user will remain substantially centered between said first and second pairs of wheels of the chair to maintain the stability of the wheelchair and the safety of the user.

2. An improvement for a wheelchair as defined in claim 1 wherein said integral seat unit includes arm rests mounted on each side of said seat portion, leg rests adjustably attached to a forward portion of said seat portion and a head rest adjustably attached to an upper portion of said back portion of said seat unit, said arm rests, leg rests, and head rest being arranged to move integrally with said seat unit whereby the user will be fully supported in any position in which the seat unit is placed.

3. An improvement for a wheelchair as defined in claim 1 wherein said movement means includes a linear actuator which is powered by an electric motor and a battery mounted in a lower portion of said base framework structure, said linear actuator including suitable control means whereby the user can control the extension or retraction of the actuator as desired, said linear actuator being attached between said base structure and said support means for slidably moving said support means and said seat unit so as to move the seat unit between a first upright position and a second reclining position.

4. An improvement for a wheelchair as defined in claim 1 wherein said support means includes a pair of guide rails which are mounted in parallel relation between cross members which are attached to the side rails of said base framework structure, and said seat support mounting means includes a support bar which is arranged substantially between said framework side support rails and at right angles to said guide rails, said support bar being slidably attached to said guide rails by means which allow the support bar to be easily moved along said guide rails.

5. An improvement for a wheelchair as defined in claim 1 wherein said means for moving the slidable support means and seat unit is a crank means having an elongated threaded shaft which is journaled to the forward portion of said framework structure and having a crank arm positioned at the opposite end of said shaft, said slidable support means includes a threaded bushing which is coupled to said threaded shaft whereby as the crank arm is rotated the slidable support means and seat unit will be positioned longitudinally with respect to said base framework structure.

6. An improvement for a wheelchair as defined in claim 1 wherein said cam means includes a slotted plate means and a cam follower means, said slotted plate means having a slot therein which is sized to fit said cam follower means, said slotted plate means being attached to said seat means, said cam follower means being fixedly attached to said wheelchair base framework structure with said cam follower means engaging the slot provided in said slotted plate means whereby the forward movement of the support means and seat unit will cause the seat unit to tilt backward to place the user in a reclining position.

7. An improvement for a wheelchair as defined in claim 6 wherein said slot in said slotted plate means is arranged in a curved configuration, the curve of said slot having a predetermined radius whereby said seat unit can be moved from a fairly upright position to a reclining position wherein the back portion of the seat unit is reclined approximately 60 degrees.

8. A wheelchair seat unit for retrofitting a motorized wheelchair having a base framework structure, the base framework structure having a forward and rearward end portion and a pair of drive wheels rotatably mounted near the rearward end and a pair of caster wheels rotatably mounted near the forward end, each of said drive wheels being drivingly connected to a separate electric drive motor and an electrical energy source mounted in a lower portion of said base framework structure, control means being mounted so that the user can control the rotation of the drive wheels to controllably move said wheelchair, the chair seat unit comprising:

a) a slidable seat support means, said support means being fixedly attached to an upper portion of said base framework structure, said support means having a rail means aligned with an axis extending in the forward and rearward direction of said base structure and a seat support bar slidably mounted on said rail means whereby said seat support bar can be slidably moved along said axis;

b) an integral seat unit having a seat portion and a back portion, said seat and back portion being joined together at a common edge in a substantially fixed angular position, said seat unit including attached arm rests, leg rests, and head rest for comfortably supporting the user;

c) cam means including a pair of slotted plates and a pair of stanchions having a cam follower pin mounted at one end of each stanchion, said follower pin being sized to slidably fit a slot provided in a corresponding slotted plate;

d) drive means having one end attached to said base framework structure and an opposite end attached to said slidable seat support means, said drive means including an electric drive motor which is electrically connected to said energy power source and a control means whereby the user can selectively move said seat support means to various positions along said axis between said drive and swivel wheels; and e) said integral seat unit includes a pivotal mounting means which attaches the seat unit adjacent to said seat common edge to said seat support means, said cam means slotted plates being fixedly attached to each side of the back portion of said seat unit near said common edge, said stanchions being fixedly mounted one each side of said base structure near the rearward end portion of said structure so that the stanchion cam follower pins engage the slots in said cam plates whereby as the seat unit is moved by the seat support means and drive means the seat unit is caused to angularly tilt from an upright position to a reclining position while maintaining the center of gravity of the chair and user between the wheels of the wheelchair to provide a stable and safe condition.

9. A wheelchair seat unit as defined in claim 8 wherein the drive means is a linear actuator which is driven by said electric drive motor, said linear actuator having one end pivotally attached to the forward portion of said framework structure and the opposite end connected to said slidable seat support means, said linear actuator including means to lock and support the seat unit in any angular position between the fully reclined position and the upright position of said chair.

10. A wheelchair seat unit as defined in claim 8 wherein the control means includes a toggle lever which allows the user to move the lever in a direction corresponding to the desired movement direction for said seat unit whereby the seat unit can be easily controlled and moved to a desired position.

11. A wheelchair seat unit as defined in claim 8 wherein the forward portion of the seat portion of the seat unit includes a plurality of spacer blocks which allows the forward portion of the seat unit to be supported on the framework structure when the seat is in the upright position.

12. A wheelchair seat unit as defined in claim 8 wherein said electrical energy source is a storage battery which is sized to drive both the drive wheels of said wheelchair as well as the drive means for moving said seat unit.

13. A wheelchair seat unit as defined in claim 8 wherein the integral seat unit has adjustment means for fixedly adjusting the angle between the seat portion and back portion of said seat unit to allow the seat unit to be fitted to the individual user.

14. A wheelchair seat unit as defined in claim 8 wherein said slidable seat support means includes a support bar which is fixedly positioned laterally across the base structure near the drive wheels and an intermediate cross member laterally positioned across said base structure and spaced forwardly of said rear cross member a predetermined distance, said seat support means further including a pair of guide rails which are arranged in parallel position and attached between said cross members with said guide rails arranged substantially parallel to a longitudinal axis of said base structure, and said seat support bar being slidably mounted on said guide rails by bearing means which allows the support bar to be easily moved along said guided rails.

15. A wheelchair seat unit as defined in claim 8 wherein the slot formed in each of said slotted plates is curved and has a predetermined radius of curvature to allow the seat unit to move to a fully reclined position, said slot being arranged when the plate is mounted on said seat unit so that said slot is substantially aligned with the back portion of said seat unit to impart the desired movement to said seat unit as said support means is moved along said axis to maintain the center of gravity of the wheelchair and user substantially centered between the wheels of said chair.

16. An assembly kit for retrofitting a wheelchair having a base framework structure having a forward end and a rearward end position, a pair of drive wheels being rotatably mounted near one end of said structure and a pair of caster rotatable wheels mounted at the opposite end of said structure, said assembly kit including:

a) a seat unit having a back portion and a seat portion, said back and seat portions being fixedly attached at a common edge so that the relative angle between the back and seat portions are relatively fixed, said seat unit including leg rests, arm rests and a head rest which are adjustably positioned to provide maximum comfort for the user;

b) a slidable seat support means mounted on an upper portion of said base framework structure and including a pair of cross members and a pair of seat guide rails, said seat guide rails are arranged parallel to each other and rigidly mounted between said cross members, said cross members being fixedly attached to side rails provided on each side of said base structure with said cross members being spaced apart by said guide rails and positioned near the end of said structure closest to the rearward portion of said structure, said guide rails having a seat support bar positioned above the guide rails and arranged perpendicular thereto, said seat support bar being attached to said guide rails by pillow blocks which slidably mount said seat support bar to said guide rails to allow movement along said guide rails with a minimum of force;

c) said seat support bar having mounting means for pivotally mounting said seat unit to the seat support bar, said seat unit being attached to said seat support bar near the common edge area of said seat unit;

d) cam control means attached to the sides of said seat unit and said base framework structure whereby as said seat support bar and seat unit are moved towards the forward end of said structure the seat unit is caused to tilt to a reclining position, said cam means including a pair of slotted cam plates which are attached to each side of the back portion of said seat unit and a pair of stanchions having a cam follower pin attached at one end, said cam follower pin being sized to slidably fit within a slot provided within each of said slotted cam plates, said stanchions being fixedly attached to each side of the framework structure and adjacent said seat unit with said cam pins arranged to project inwardly towards said seat unit and engage the cam slotted plates; and e) a power drive means having control means, said power drive means being attached to the forward end of said framework structure with the opposite end connected to said seat support bar whereby as the drive means is actuated said support bar will be moved along said guide rails so that said seat unit will tilt backward to a reclining position as the seat portion is moved towards the forward end of said structure whereby the center of gravity of the user and modified wheelchair will remain substantially centrally positioned between the support wheels of said wheelchair to maintain the stability and safety of said wheelchair.

17. An assembly kit as defined in claim 16, wherein the drive means is a linear actuator having an extendable push rod at one end, said push rod being connected to said seat support bar whereby when the linear actuator is deenergized the seat support bar and the seat will be locked in the existing position to prevent the seat from accidentally changing position.

18. A kit assembly as defined in claim 16, wherein the slotted cam plate which is attached to each side of the seat unit includes a second curved slot and a bolt positioned through said curved slot and said seat back portion so that the angular position between said seat portion and back portion can be angularly adjusted.

19. A kit assembly as defined in claim 16, wherein the control means for controlling the drive means is mounted on one of said arm rests whereby the user can easily contact the control means to control the movement of said seat support bar so as to easily adjust the reclining angular position of the seat unit with respect to the wheelchair framework structure.

20. A kit assembly as defined in claim 16, wherein the pillow blocks attaching the seat support bar to the guide rails are of the endless ball bearing type to minimize the coefficient of friction between the support bar and guide rails.

* * * * *